United States Patent [19]

Brockman

[11] Patent Number: 5,113,443
[45] Date of Patent: May 12, 1992

[54] METHOD FOR SCRAMBLING SATELLITE COMMUNICATIONS

[76] Inventor: Milton H. Brockman, 912 Begonia Ct., Carlsbad, Calif. 92009

[21] Appl. No.: 555,842

[22] Filed: Jul. 9, 1990

Related U.S. Application Data

[62] Division of Ser. No. 74,954, Jul. 17, 1987, Pat. No. 4,956,864.

[51] Int. Cl.$^5$ ............................................. H04L 27/10
[52] U.S. Cl. ......................................... 380/34; 380/9; 380/10; 380/49; 375/40; 375/1
[58] Field of Search ................... 380/9, 33, 34, 36, 49; 375/1, 40

[56] References Cited

U.S. PATENT DOCUMENTS

| | | | |
|---|---|---|---|
| 4,179,657 | 12/1979 | Hobbs | 380/34 |
| 4,443,799 | 4/1984 | Rubin | 375/1 X |
| 4,905,221 | 2/1990 | Ichiyoshi | 375/1 X |

Primary Examiner—Bernarr E. Gregory
Attorney, Agent, or Firm—James T. English

[57] ABSTRACT

A secure communications system multiplexes segments of the information signal for keyed encoding and modulation onto a plurality of different carrier frequencies and/or polarizations, and transmits the encoded carriers to multi-channel signal summing receivers that decode the segments from all channels, to reassemble the information signal for use by authorized stations with a key. The use of the multi-channel link and the summing receiver allows the greatest number of different coding algorithms for accommodating the greatest number of discrete secure channels.

4 Claims, 3 Drawing Sheets

METHOD FOR SCRAMBLING SATELLITE COMMUNICATIONS

ORIGIN OF THE INVENTION

This invention was made with Government support under NAS7-918 awarded by NASA. The Government has certain rights in the invention.

REFERENCE TO PRIOR PATENT APPLICATIONS

This patent application is a division of a pending application entitled: RECEIVER FOR COMMUNICATIONS SATELLITE DOWNLINK RECEPTION, Ser. No. 074,954 by the same inventor, now U.S. Pat. No. 4,956,864.

BACKGROUND OF THE INVENTION

The rapid transfer of important digital data including facsimilie, as well as analog information such as television pictures is becoming increasingly a part of business administration. Business establishments remain competitive by their ability to rapidly transfer sales and customer information between centers over nationwide or global communications links. The importance of preventing competitors from intercepting and using discreet or confidential information such as customer names and addresses or new product development information is increasingly important. Therefore, secure communications that can be interpreted only by authorized users is required to be more complex than the simple scrambling systems and algorithms of the past. A communications system that provides the greatest number of cryptographic algorithms for security coding of the information signal is required for highly competitive global commerce. It is presently possible to intercept signals radiated on a single carrier frequency and a single polarization by computer analysis of the signal. Splitting the information signal into segments for radiation on a plurality of carrier frequencies and polarizations increases the difficulty of intercepting the information in proportion to the number of frequencies and/or polarizations; i.e., the number of channels. This difficulty is further increased by further encoding each channel by well known aerospace coding methods. Enhancement of the signal by error detection and correction are also possible when the channel is encoded. By using a signal channel composed of a plurality of frequencies and/or polarizations, a receiver that sums the discrete signals to provide a signal power gain and provides extended information decoding capabilities, can be used.

BRIEF DESCRIPTION OF THE INVENTION

The invention multiplexes segments of the information signal for keyed encoding and modulation onto a plurality of different carrier frequencies and/or polarizations, and transmits the encoded carriers to multi-channel signal summing receivers that decode the segments from all channels to reassemble the information signal for use by authorized stations with the key. The use of the multi-channel link and the summing receiver allows the greatest number of different coding algorithms for accommodating the degree of scrambling desired for security. For commercial data files of considerable importance to corporations, for example, a high degree of encryption would be used. The architecture of the summed multi-channel receiver, described in the parent application referenced above, lends itself well to encryption of communications signals by frequency diversity, either alone or in combination with other encrypting or encoding techniques. In frequency diversity, a television transmission or other data are split up among the channels of the multi-channel summing receiver, each channel operating at a different frequency making up the summed system and are reassembled by keyed decoding functions with the key being changeable and known only to the subscribers. Since the carrier signals are coherently summed and demodulated, they can each carry discrete segments of the modulation. This permits simultaneous transmission of at least two separate messages since one or more additional messages can be included during those intervals when the several receivers are not carrying discrete segments of the initial message. The frequency diversity encryption method is adaptable to the widely used aerospace, generally post-detection, encoding methods that are fully developed. These include pseudonoise coding and interleaved Reed-Solomon coding, as well as the simpler multiplexing algorithms. The proper encoding algorithm can produce improved data since error correction, data compression and dropout compensation can be employed.

Another aspect of the summed receiver system used with this encryption invention is its adaptability to frequency reuse; i.e., transmitting and receiving separate information on orthogonal polarizations of the same signal. As an illustration, six channels of the summing receiver can be split up into three antennas, each having orthogonal polarization output ports. In this manner, six different carriers; i.e., three different frequencies and two polarizations, can be used for frequency diversity, since each antenna has a polarization diversity capability, enabling a plurality of different algorithms for secure communications in addition to the well known coding techniques.

The novel receiver, fully described in the parent case, is uniquely adaptable to all the modes of satellite transmission and services that are in use or planned for the near future. In addition, its use of a plurality of small antennas that can be placed virtually anywhere, make it the best choice for the communications services that are or will be available.

DESCRIPTION OF THE PREFERRED EMBODIMENTS

Figure 1:
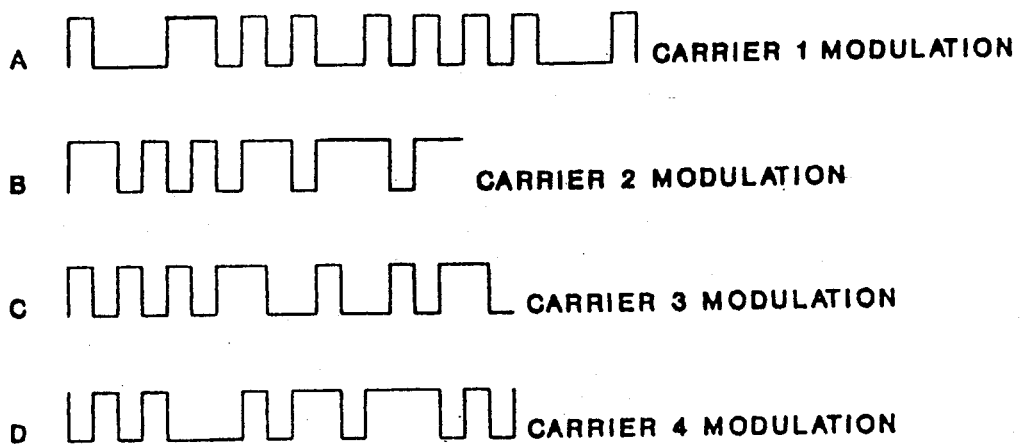
FIG. 1 is a diagram of one possible scheme for a segmented data stream wherein the segments are multiplexed on a plurality of carriers and/or polarizations for encrypting the data.
Figure 1:
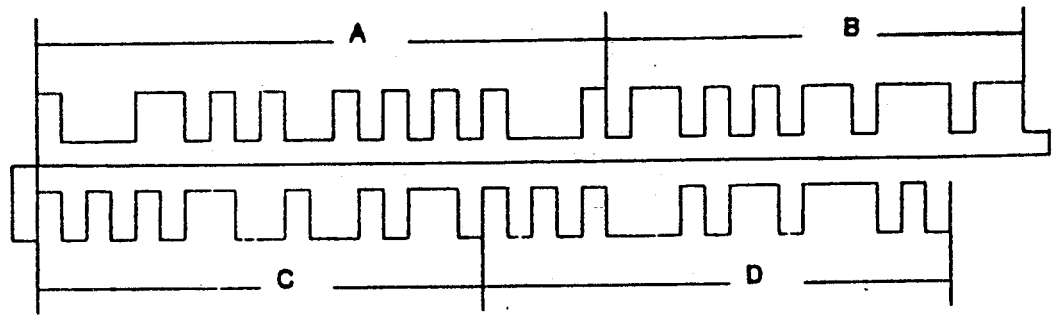

Referring to FIG. 1 it can be seen that an algorithm that splits up a confidential data stream for modulation onto carriers 1, 2, 3, and 4 might have the segments A, B, C, and D. These segments are multiplexed onto the carriers 1 through 4 and transmitted. The summing receiver of FIGS. 2 and 3 reconstruct the data stream so that it appears continuous as in A B C D, FIG. 1. It is apparent that each individual segment can additionally be encoded for specific effects, such as data compression, before being multiplexed onto the individual carriers and/or polarizations of the four carriers A, B, C, and D. It can be seen that the summed receiver affords a great number of possibilities for encoding confidential data streams while conserving the power put into the carriers. The data stream A B C D is available at the summing junction for demodulation or further decoding.

Figure 2:
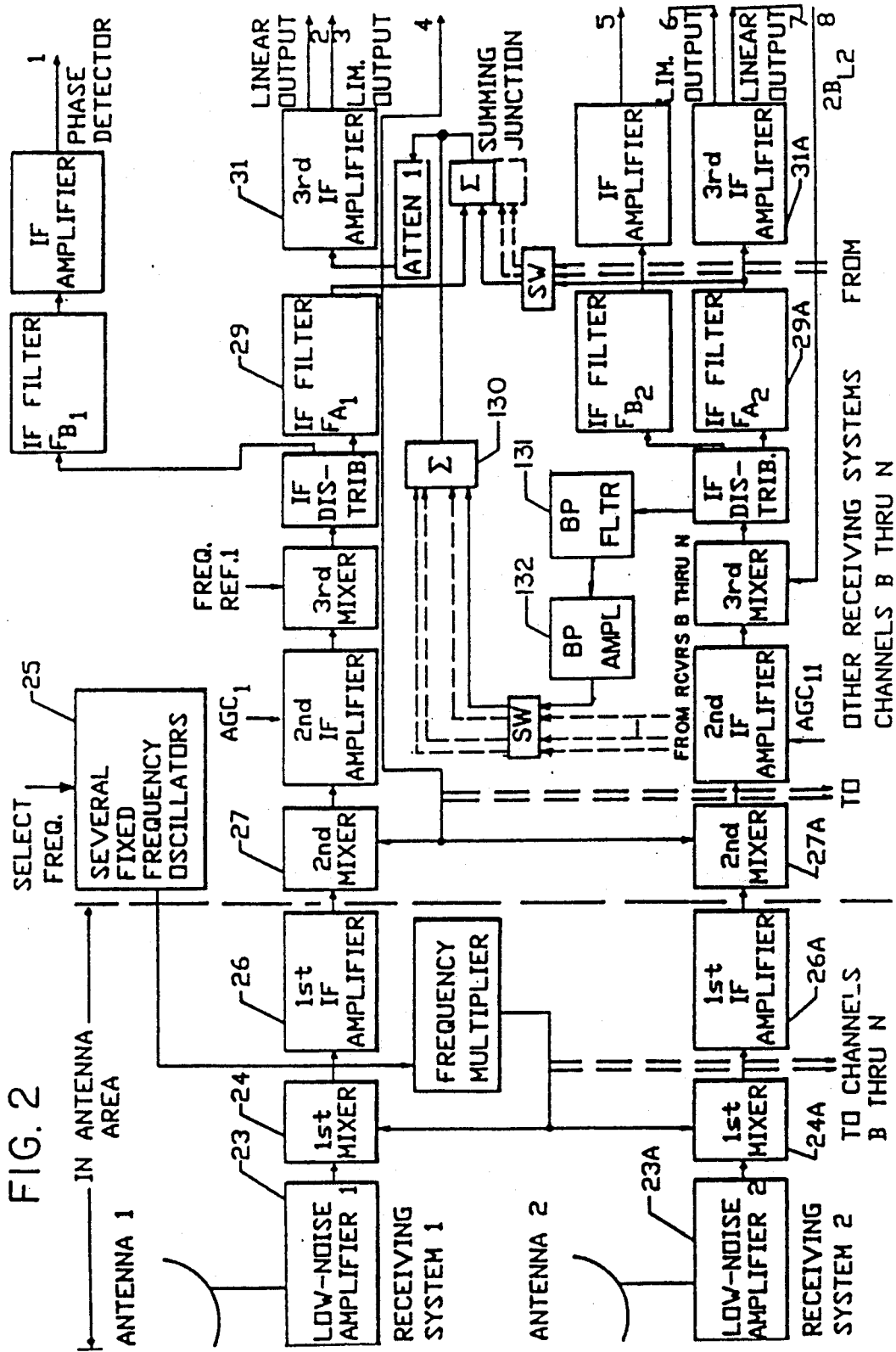
FIG. 2 with FIG. 3 is a schematic block diagram of the frequency and polarization diversity embodiment of the summing receiver of the parent case included herein since it is capable of performing the algorithms of this invention.
Figure 3:
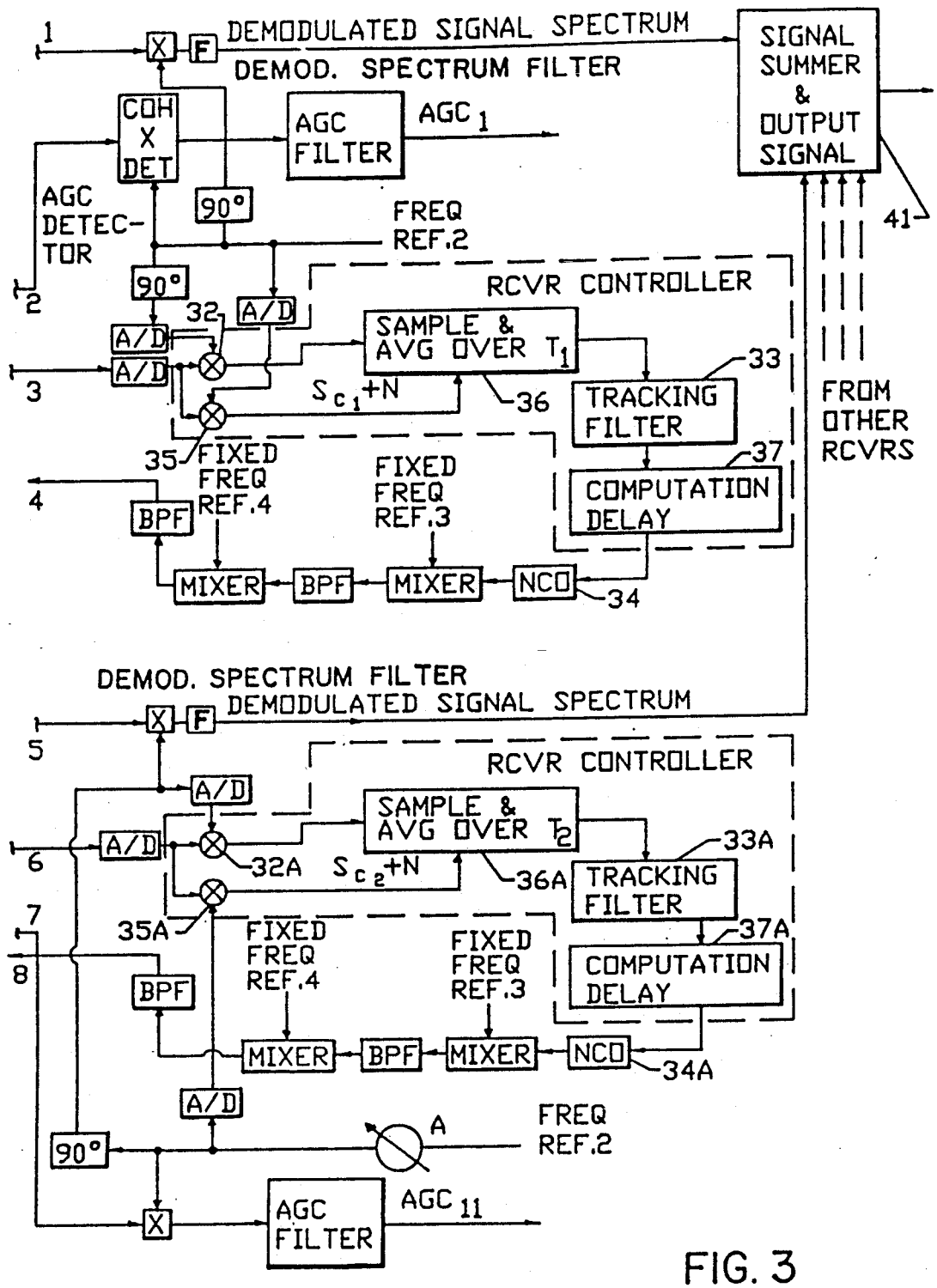
FIG. 3 is a part of the block diagram (FIG. 2) of the digital controller for controlling the bandwidth of the phase locked loop local oscillator of the summing receiver.

Reference is now directed to FIG. 2 which shows an embodiment of the invention for frequency diversity, frequency reuse for bandwidth conservation by transmitting information on orthogonal components of the same carrier frequency, and a polarization diversity mode of operation. It can be seen from FIG. 2 that the architecture of the receiver is different from the summing receiver described in the parent case by the following distinctions:

Each receiver operates at a different frequency, yet they remain coherent with the main receiver system by virtue of the fact that the main receiver controller phase locked loop output is applied to a mixer 44 which also receives a phase stable fixed frequency reference so that the output of the mixer 44 is a frequency offset from the main receiver frequency and differing from the input signal from the first IF amplifier of the branch receiver, emanating from the antenna area, by the second IF frequency. The bandpass filters 45 and 46 establish the bandwidth limit and select the proper frequency output of the mixers 42 and 44. It will be appreciated that this implementation allows each branch receiver to operate at a different frequency while maintaining phase coherence with the main carrier signal and enables summing of the third IFs which are at the same frequency. The demodulated signal spectrum from each receiver is applied to a modulation summing circuit as in the embodiment of FIGS. 2 and 3. It is apparent that since the modulation spectrums can be summed, different segments of the modulation can be transmitted on separate carriers received by separate receiver channels. These carriers can further be encoded with the same or separate codes and decoded after the summing circuit 41, FIG. 2. Thus, a two dimensional encoding or scrambling system is provided for secure communications.

Another embodiment of the versatile receiver adapts it to bandwidth conserving frequency reuse modes of transmission. With reference to FIG. 2, with FIG. 3, each antenna can employ an orthomode feed 51 such that the main receiver channel can receive the signal from one of the orthogonal polarization ports while a branch receiver can receive orthogonal polarization signals from the other.

Also, in this embodiment, two of the branch receivers can receive the signals from orthogonal polarization ports of the second antenna. This technique can be expanded to a third antenna with orthogonal polarization ports and two additional branch receivers. This configuration is also advantageous for secure communications wherein segments of the data spectrum can be multiplexed on orthogonal polarizations of the carrier according to an algorithm. The combination of frequency diversity as described earlier and polarization diversity is possible wherein a carrier frequency of left circular polarization and another carrier offset therefrom can have right circular polarization, both carriers containing modulation or encoding segments thereof, can be combined in the receiver of FIG. 2 and FIG. 3, thereby providing two additional dimensions for encoding or encryption algorithms.

What is claimed is:

1. The method of frequency diversity encryption for scrambling communications of information signals radiated on a plurality of carriers, between authorized multi-channel stations, each channel having a different carrier frequency, the radiated information signals being modulation-method independent and encoding-method independent, the method of frequency diversity encryption comprising the steps of:
    splitting up the encoded information signals into segments for multi-channel transmission;
    encrypting the encoded information signal segments by multiplex modulating the segments onto the plurality of separate carrier frequencies in a sequence according to an algorithm having a key;
    transmitting the multiplex modulated encoded information signal segments modulated onto the plurality of separate carrier frequencies to provide multichannel scrambled transmission;
    receiving the scrambled multichannel transmission and amplifying, coherently heterodyning, and summing the separate carrier frequencies:
    demodulating and summing the multiplex modulated encoded information signal segments of the encoded information signals on the separate carrier frequencies;
    demultiplexing the summed multiplexed segments according to said algorithm using said key, and distributing the summed demultiplexed encoded information signals to authorized users of each encoded information signal.

2. The method, of frequency diversity encryption for scrambling communications of information signals radiated on a plurality of carriers, as described in claim 1, wherein unrelated information signals are transmitted on separate carrier frequencies, whereby a network of receiving stations, each having a summed receiver, demodulates part of an information signal.

3. The method of frequency diversity encryption for scrambling communications of information signals radiated on a plurality of carriers, as described in claim 1 or 2, wherein information signals are transmitted on separate polarizations of the carrier frequencies.

4. The method of frequency diversity encryption for scrambling communications of information signals radiated on a plurality of carriers, as described in claim 1 or 2, wherein information signals are transmitted on separate carrier frequencies, and on separate polarizations of the carrier frequencies.

* * * * *